United States Patent [19]

Hsu et al.

[11] Patent Number: 4,678,720

[45] Date of Patent: Jul. 7, 1987

[54] SILVER-COPPER-TITANIUM BRAZING ALLOY

[75] Inventors: Shih C. Hsu, Wellesley; Ramas V. Raman, Framingham, both of Mass.

[73] Assignee: GTE Laboratories Incorporated, Waltham, Mass.

[21] Appl. No.: 895,525

[22] Filed: Aug. 11, 1986

Related U.S. Application Data

[63] Continuation of Ser. No. 688,679, Jan. 4, 1985, abandoned.

[51] Int. Cl.$^4$ .................. B23K 35/34; B23K 35/362; C22C 1/02; C22C 5/08
[52] U.S. Cl. .................................... 428/606; 164/461; 164/463; 164/473; 164/487; 164/69.1; 228/263.11; 228/263.18; 420/492; 420/497; 428/607
[58] Field of Search ............... 164/461, 463, 473, 487, 164/69.1; 228/263.11, 263.18; 420/492, 497; 428/606, 607

[56] References Cited

U.S. PATENT DOCUMENTS

| 2,950,189 | 8/1960 | Ames | 420/488 |
| 3,515,542 | 6/1970 | Larsen | 420/492 |
| 3,570,110 | 3/1971 | Zdanuk | 228/263.18 |
| 4,426,033 | 1/1984 | Mizuhara | 420/492 |
| 4,448,853 | 5/1984 | Fischer et al. | 228/263.12 |
| 4,508,257 | 4/1985 | Bose et al. | 164/463 |
| 4,523,625 | 6/1985 | Ast | 164/463 |

FOREIGN PATENT DOCUMENTS

| 2066291 | 7/1981 | United Kingdom | 420/492 |
| 2141370 | 12/1982 | United Kingdom | 228/263.12 |

Primary Examiner—James C. Cannon
Attorney, Agent, or Firm—Ivan L. Ericson

[57] ABSTRACT

A silver-copper-titanium brazing alloy foil was produced by a rapid solidification processing method(s). The composition ranged from 10 to 50 weight percent copper, 0.1 to 9.5 weight percent titanium and the balance silver. Since the method provides high cooling rates, at least 10000° C. per second, unique alloy structures and properties were obtained. This resulting foil can be used in the as cast form, it can be rolled down to a thinner dimension having also a more uniform surface finish, or it can be punched into preforms.

9 Claims, 4 Drawing Figures

SILVER-COPPER-TITANIUM BRAZING ALLOY

This is a continuation of co-pending application Ser. No. 688,679 filed on Jan. 4, 1985, now abandoned.

FIELD OF THE INVENTION

This invention relates to brazing alloys. More particularly it relates to a silver-copper-titanium brazing alloy.

BACKGROUND OF THE INVENTION

Prealloyed brazing foils of silver-copper-titanium are not commercially available because titanium and/or titanium containing intermetallic phase(s) are distributed unevenly throughout a silver-copper phase during ingot casting thereby rendering subsequent ingot rolling and/or punching to produce braze preforms very difficult; especially when the titanium composition is greater than two weight percent.

Because of the processing difficulties, silver-copper-titanium alloy foils are produced in a laminated form where the titanium layer is bonded between two silver-copper alloy layers to form the silver-copper-titanium laminated brazing foil.

There is a need to produce a silver-copper-titanium brazing alloy which can be rolled to a thin foil and/or punched from a foil into braze preforms.

OBJECTS OF THE INVENTION

Accordingly, it is an object of the present invention to provide a new and improved silver-copper-titanium brazing alloy which can be rolled into a thin foil.

Further objects of the present invention will become apparent from the description contained herein.

SUMMARY OF THE INVENTION

In accordance with the present invention, there is provided a new and improved silver-copper-titanium brazing alloy foil. The foil comprises from about 10 to about 50 weight percent copper, from about 0.1 to about 9.5 weight percent titanium and the balance silver.

The foil is at least 0.0008 inches thick and the titanium is uniformly distributed throughout the foil.

For a better understanding of the present invention, together with other and further objects, advantages and capabilities thereof, reference is made to the following disclosure and appended claims in connection with the above-described drawing.

DETAILED DESCRIPTION

Using a rapid solidification processing method, a homogeneous Ag-Cu-Ti alloy ductile foil was produced. The alloy composition ranges from about 10 to about 50 weight percent copper, 0.1 to 9.5 weight percent titanium and the balance silver. Preferably, this alloy ranges from 20 to 40 weight percent copper, one to five weight percent titanium and the balance silver. The foil thickness was at least 0.0008 inch, preferably 0.0008 to 0.006 inch thick, more preferably 0.001 to 0.004 inch thick. As even distribution of fine titanium and/or titanium containing phase(s) was obtained in the rapidly solidified foil. This foil can be used directly for brazing, or this foil can be further rolled down to a thinner dimension having a more uniform foil surface finish. Rolling and/or punching the foil into braze preforms can be carried out surprisingly easily because of the uniform distribution of titanium and/or titanium containing hard phase(s) within the silver-copper alloy matrix rendering the foil ductile rather than brittle.

A mixture of 68.8 grams of silver, 26.7 grams of copper and 4.5 grams of titanium were heated to 980° C. in a melt spinning quartz crucible, preferably a graphite coated quartz crucible having a yttria coating on the graphite. The molten mixture was melt spun to form a ductile foil. The crucible has a 1mm diameter orifice, and an ejecting overpressure of 2 psi was used. The crucible was positioned 0.25 inches above and perpendicular to a chill wheel. The wheel is made from copper and has an 8" diameter and is 2" wide. The wheel was run at 1519 rpm, with internal cooling water. The overpressure gas was argon. The resulting 0.001 inch thick ductile foil was punched to make braze preform without cracking.

Figure 1:
FIG. 1 is a scanning electron photomicrograph (SEPM) of a longitudinal cross section of a silver-copper-titanium brazing foil of the present invention at a magnification of 750 times (750×).
Figure 3:
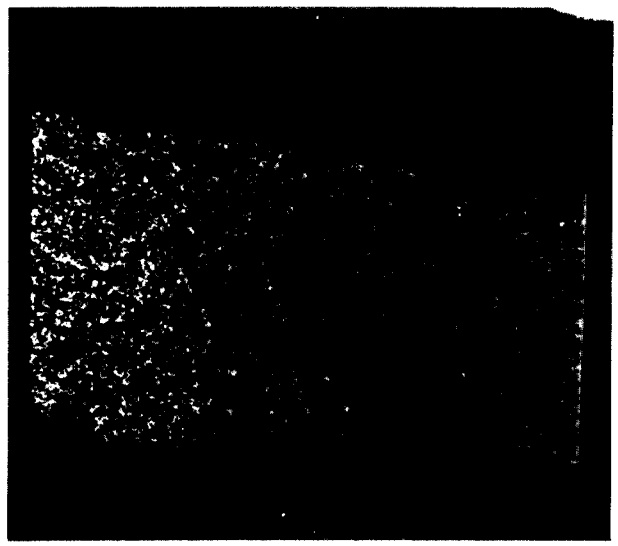
FIG. 3 is a x-ray dot map of the titanium distribution in the silver-copper-titanium brazing foil depicted in FIG. 1.

An example of the homogeneous morphology of a silver-copper-titanium brazing foil of the present invention is shown in FIG. 1. FIG. 1 is a scanning electron photomicrograph (SEPM) of a longitudinal cross section of a silver-copper-titanium brazing foil at a magnification of 750 times (750×). This foil was made by melting 1 7 w/o titanium, 70.8 w/o silver, and 27.5 w/o copper at 980° C. and rapid quenched by a melt spinning technique as described above. As shown in FIG. 1 the grains are very fine and uniformly distributed throughout the cross section. An x-ray dot map of the titanium distribution of this brazing foil is shown in FIG. 3 illustrating the uniform distribution of fine grains of titanium and/or titanium containing phase(S) throughout the longitudinal cross section of the foil.

Figure 2:
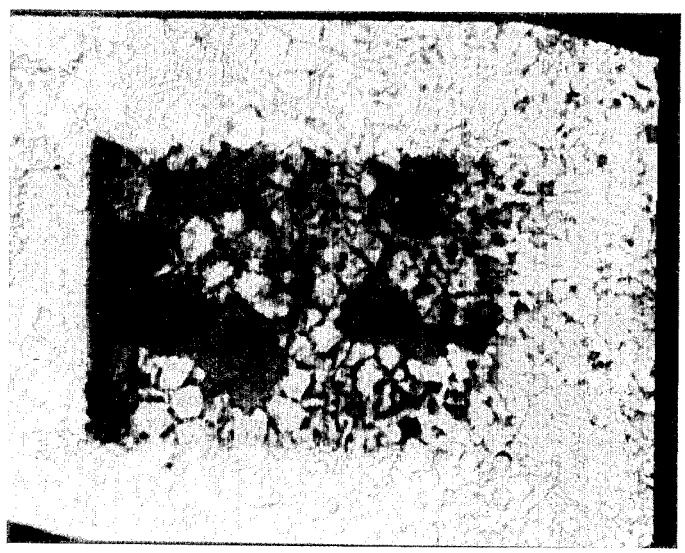
FIG. 2 is a (SEPM) of a cross section of a silver-copper-titanium ingot at a magnification of 330 times (330×).

This is compared to the SEPM cross section of an ingot of the same starting material, 1.7 w/o titanium, 70.8 w/o silver, and 27.5 w/o copper, which was melted at 980° C. and cast as an ingot shown in FIG. 2. The grains of the ingot are much larger and have a much broader grain size distribution than the material shown in FIG. 1.

Figure 4:
FIG. 4 is a x-ray dot map of the titanium distribution in the silver-copper-titanium ingot depicted in FIG. 2.

The magnification of the SEPM in FIG. 2 is only 330 times (330×) compared to the magnification of the SEPM in FIG. 1 which is 750 times (750×) and yet the grains in FIG. 1 are very small in comparison. The titanium distribution of the ingot is illustrated in the x-ray dot map shown in FIG. 4 at a magnification of 500 times (500×). FIG. 4 illustrates the non-uniform distribution of titanium throughout the cross section of the ingot.

The cast ingot is very brittle and can not be rolled into a foil or made into preforms by a punch technique without cracking. This is attributed to the non-uniform distribution of the titanium throughout the ingot.

However, the disadvantage of a brittle, unworkable alloy has been overcome by the present invention which has the titanium uniformly and finely distributed throughout the alloy as shown in FIG. 3 and can be worked by rolling and/or punching to make preforms without cracking.

While there have been shown what are at present considered to be the preferred embodiments of the invention, it will be obvious to those skilled in the art that various changes and modifications may be made therein without departing from the scope of the invention as defined by the appended claims.

What is claimed is:

1. A silver-copper-titanium brazing foil preform comprising from about 10 to about 50 weight percent copper, from about 0.1 to about 9.5 weight percent titanium and the balance silver; said preform having very fine and uniformly distributed grains;

said foil preform having been fabricated by heating titanium, silver and copper in a crucible to form a melt; said crucible having had an orifice, said crucible having been positioned above a revolving chill wheel; said melt having been ejected upon said wheel by an overpressure of a gas to form a ductile foil from about 0.0008 inches to about 0.006 inches thick; and said ductile foil having been punched to form said brazing foil preform.

2. A silver-copper-titanium brazing foil in accordance with claim 1 wherein said copper being from 20 to 40 weight percent, said titanium being from 1 to 5 weight percent and the balance being silver.

3. A silver-copper-titanium brazing foil in accordance with claim 1 wherein said foil being from about 0.001 to about 0.004 inches thick.

4. A method of making a silver-copper-titanium brazing foil having from about 10 to about 50 weight percent copper, from about 0.1 to about 9.5 weight percent titanium and the balance silver, being from about 0.0008 inches to about 0.006 inches thick and ductile, and having very fine and uniformly distributed grains comprising the following steps:

Step 1—heating from about 10 to about 50 weight percent copper, from about 0.1 to about 9.5 weight percent titanium and the balance silver to melt said copper, titanium and silver to form a molten mixture; and Step 2—melt spinning said molten mixture upon a chill wheel to form a foil being form about 0.0008 inches to about 0.006 inches thick and ductile, said foil having very fine and uniformly distributed grains.

5. A method in accordance with claim 4 wherein said heating comprises heating at about 980° C.

6. A method in accordance with claim 4 wherein said melt spinning comprises melt spinning using a melt spinning crucible having a 1mm diameter orifice, an ejecting overpressure of about 2 psi argon, said crucible being positioned about 0.25 inches above and perpendicular to a chill wheel, and said chill wheel running at about 1519 rpm with internal cooling water.

7. A method in accordance with claim 4 wherein said titanium being about one to about 5 weight percent.

8. A method in accordance with claim 4 wherein said foil being from about 0.001 inches to about 0.004 inches.

9. A silver-copper-titanium brazing foil made in accordance with claim 4.

* * * * *